US009928083B2

(12) United States Patent
Joo et al.

(10) Patent No.: US 9,928,083 B2
(45) Date of Patent: Mar. 27, 2018

(54) TAB TRIMMING (75) Inventors: Young Kun Joo, Issaquah, WA (US); Jason R. Olson, Sammamish, WA (US); Vinay Kumar Venkatachalapathy, Seattle, WA (US); Maxim B. Oustiougov, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 931 days.

(21) Appl. No.: 13/179,182

(22) Filed: Jul. 8, 2011

(65) Prior Publication Data

US 2013/0014047 A1    Jan. 10, 2013

(51) Int. Cl.
G06F 3/048 (2013.01)
G06F 9/44 (2018.01)
G06F 3/0488 (2013.01)

(52) U.S. Cl.
CPC ........ G06F 9/4443 (2013.01); G06F 3/04886 (2013.01)

(58) Field of Classification Search
CPC combination set(s) only.
See application file for complete search history.

(56) References Cited

U.S. PATENT DOCUMENTS

| | | | |
|---|---|---|---|
| 5,874,962 A * | 2/1999 | de Judicibus et al. | 715/789 |
| 6,544,295 B1 * | 4/2003 | Bodnar | 709/219 |
| 6,681,298 B1 * | 1/2004 | Tso | G06F 17/30902 707/E17.12 |
| 7,146,353 B2 * | 12/2006 | Garg et al. | |
| 7,596,760 B2 * | 9/2009 | Sauve et al. | 715/777 |
| 7,873,915 B2 | 1/2011 | Sauve et al. | |
| 8,255,828 B2 * | 8/2012 | Harris et al. | 715/810 |
| 2005/0120385 A1 * | 6/2005 | Stalker | 725/134 |
| 2005/0141554 A1 * | 6/2005 | Hammarlund et al. | 370/468 |
| 2006/0271861 A1 | 11/2006 | Yolleck et al. | |
| 2007/0083813 A1 | 4/2007 | Lui et al. | |
| 2009/0183155 A1 | 7/2009 | Praitis et al. | |
| 2009/0287824 A1 * | 11/2009 | Fisher et al. | 709/226 |
| 2010/0011313 A1 * | 1/2010 | Sauve et al. | 715/777 |
| 2012/0179744 A1 * | 7/2012 | Sullivan | G06F 9/4443 709/203 |

(Continued)

OTHER PUBLICATIONS

"BarTab :: Add-ons for Firefox—Mozilla Add-ons", published May 24, 2010, taken from https://addons.mozilla.org/En-us/firefox/addon/bartab/, pp. 1-3.*

(Continued)

Primary Examiner — William Bashore
Assistant Examiner — Gregory A Distefano
(74) Attorney, Agent, or Firm — Schwabe, Williamson & Wyatt, P.C.

(57) ABSTRACT

Various embodiments proactively monitor and efficiently manage resource usage of individual tabs. In at least some embodiments, one or more tabs can be dehydrated in accordance with various operational properties, and rehydrated when a user actually activates a particular tab. In at least some embodiments, rehydration can occur on a tab-by-tab basis, while at least some tabs remain dehydrated. Dehydrated tabs can, in some embodiments, be visually presented to a user in a manner in which normal, active tabs are presented.

13 Claims, 7 Drawing Sheets

(56) References Cited

U.S. PATENT DOCUMENTS

2013/0318428 A1* 11/2013 Son .................. G06F 17/30902
715/234

OTHER PUBLICATIONS

"How do I chang Tab text font/color?", taken from Firefox Support Forum, posted Jul. 30, 2008, pp. 1, 2.*
"BarTab Version History", taken from Add-ons for Firefox, published May 24, 2010, pp. 1-9.*
http://web.archive.org/web/20100316181015/http://www.linnhe2.free-online.co.uk/firefox/chrome.html, published Mar. 6, 2010, 22 pages.*
http://www.howtogeek.com/howto/17713/put-unused-tabs-on-hold-in-firefox/, published May 25, 2010, 7 pages.*
Visibo., "TooManyTabs—Saves Your Memory 1.3.3", Retrieved at <<https://addons.mozilla.org/en-US/firefox/addon/toomanytabs-saves-your-memory/>>, Retrieved Date: May 3, 2011, pp. 8.
"Using Load on Demand in WebTab", Retrieved at <<http://help.infragistics.com/Help/NetAdvantage/ASPNET/2010.1/CLR3.5/html/WebTab_Using_Load_on_Demand_in_WebTab.html>>, Retrieved Date: May 3, 2011, p. 1.
"Auto-Bundle/Auto-Save Tabs to save memory", Retrieved at <<http://www.google.com/support/forum/p/Chrome/thread?tid=6887c56063dcd57e&hl=en>>, Retrieved Date: May 5, 2011, p. 1.
"BarTab Speeds up Firefox, Loads Tabs on Demand", Retrieved at <<http://www.ghacks.net/2010/07/22/bartab-speeds-up-firefox-loads-tabs-on-demand/>>, Retrieved Date: May 3, 2011, pp. 3.

* cited by examiner

Fig. 7

TAB TRIMMING

BACKGROUND

Web browsers can consume a large amount of system resources which can not only impact the user's Web browsing experience, but can also degrade the user's overall system experience. With the ability to open multiple tabs, it has become increasingly easier for users to unknowingly impact a system's performance by opening too many tabs and by not closing tabs that are no longer being used. Further, it is very difficult to control resource usage of each individual webpage that a user may browse to within a particular tab.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments proactively monitor and efficiently manage resource usage of individual tabs. In at least some embodiments, a web browser can employ heuristics to determine which tab or tabs to dehydrate. The heuristics can employ a number of different operational properties which, collectively, can contribute to a ranking for individual tabs. Tabs can then be dehydrated in accordance with their computed rankings. Tabs can then be selectively rehydrated as a user interacts with the Web browser. For example, tabs can be rehydrated when a user actually activates a particular tab. In at least some embodiments, rehydration can occur on a tab-by-tab basis, while at least some tabs remain dehydrated.

In at least some embodiments, dehydrated tabs are visually presented to a user in a manner in which normal, active tabs are presented. Thus, from a user experience standpoint, it appears that all tabs are active. In at least some embodiments, dehydrated tabs can have their associated state saved such that when a dehydrated tab is rehydrated, the state can be restored in a manner that is generally seamless from a user's perspective.

BRIEF DESCRIPTION OF THE DRAWINGS

The detailed description is described with reference to the accompanying figures.

DETAILED DESCRIPTION

Overview

Various embodiments proactively monitor and efficiently manage resource usage of individual tabs. In at least some embodiments, a web browser can employ heuristics to determine which tab or tabs to dehydrate. The heuristics can employ a number of different operational properties which, collectively, can contribute to a ranking for individual tabs. Tabs can then be dehydrated in accordance with their computed rankings. Different operational properties can include, by way of example and not limitation, resource usage such as memory usage, age of the tab, last accessed time, possible impact on the user interface, and presence of an incomplete task.

Tabs can then be selectively rehydrated as a user interacts with the Web browser. For example, tabs can be rehydrated when a user actually activates a particular tab. In at least some embodiments, rehydration can occur on a tab-by-tab basis, while at least some tabs remain dehydrated.

In at least some embodiments, dehydrated tabs are visually presented to a user in a manner in which normal, active tabs are presented. Thus, from a user experience standpoint, it appears that all tabs are active. In at least some embodiments, dehydrated tabs can have their associated state saved such that when a dehydrated tab is rehydrated, the state can be restored in a manner that is generally seamless from a user's perspective.

In the following discussion, an example environment is first described that is operable to employ the techniques described herein. Next, a section entitled "Tab Trimming" describes how tabs can be trimmed in accordance with one or more embodiments. Next, a section entitled "Tab Trimming Using a Rating System" describes how tabs can be trimmed using a rating system. Following this, a section entitled "Dehydrated Tab Visualization" describes how dehydrated tabs can be visualized in accordance with one or more embodiments. Last, a section entitled "Example Device" describes aspects of an example device that can be utilized to implement one or more embodiments.

Having considered an overview of the embodiments about to be described, consider now a discussion of an example environment in which various embodiments can operate.

Example Environment

Figure 1:
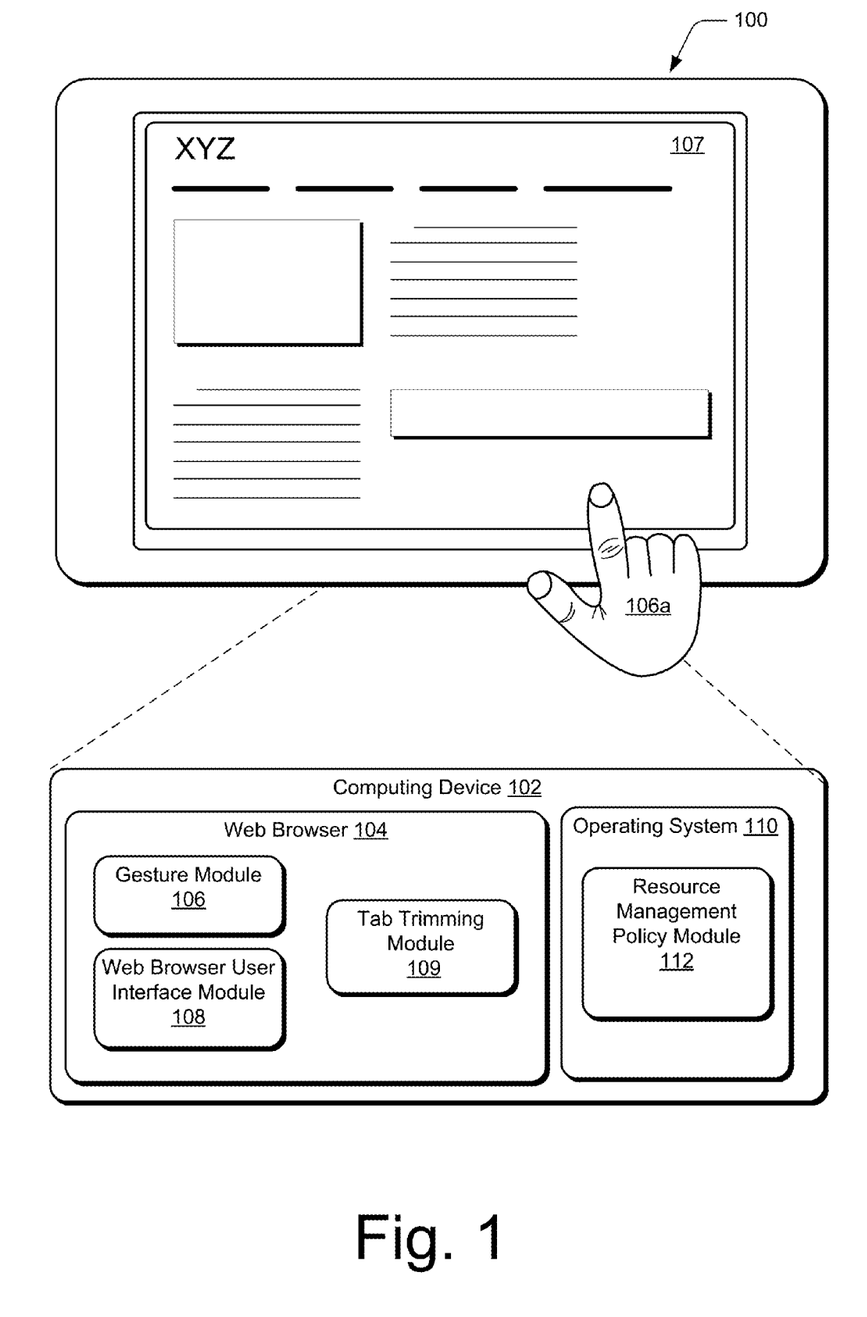
FIG. 1 is an illustration of an environment in an example implementation in accordance with one or more embodiments.

FIG. 1 is an illustration of an environment 100 in an example implementation that is operable to employ the techniques as described herein. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. In one or more embodiments, the computing device is embodied as a slate-type or tablet-type form factor device that can typically be held by a user in one hand, and interacted with using the other hand.

Thus, the computing device 102 may range from full resource devices with substantial memory and processor resources (e.g., personal computers, game consoles, slate or tablet-form factor device) to a low-resource device with limited memory and/or processing resources (e.g., traditional set-top boxes, hand-held game consoles). The computing device 102 also includes software that causes the computing device 102 to perform one or more operations as described below.

Computing device 102 includes various applications including a web browser 104 that is operational to provide web browsing functionality as described in this document. The web browser can be implemented in connection with any suitable type of hardware, software, firmware or combination thereof. In at least some embodiments, the web browser is implemented in software that resides on some type of tangible, computer-readable medium examples of which are provided below.

Web browser 104 can include or otherwise make use of, in this example, a gesture module 106, a web browser user interface module 108, and a tab trimming module 109. The computing device also includes an operating system 110 that may or may not include a resource management policy module 112, as described below.

Gesture module 106 is representative of functionality that can recognize a wide variety of gestures that can be employed in connection with web browsing activities. The gestures may be recognized by module 106 in a variety of different ways. For example, the gesture module 106 may be configured to recognize a touch input, such as a finger of a user's hand 106a as proximal to display device 107 of the computing device 102 using touch screen functionality. Alternately or additionally, the computing device 102 may be configured to detect and differentiate between a touch input (e.g., provided by one or more fingers of the user's hand 106a) and a stylus input provided by a stylus. The differentiation may be performed in a variety of ways, such as by detecting an amount of the display device 107 that is contacted by the finger of the user's hand 106a versus an amount of the display device 107 that is contacted by the stylus.

Thus, the gesture module 106 may support a variety of different gesture techniques through recognition and leverage of a division between stylus and touch inputs, as well as different types of touch inputs.

The web browser user interface module 108 is configured, in this particular example, to provide a web browser user interface that permits users to become more fully immersed in web page content that is displayed by the web browser. One or more embodiments emphasize a "content-over-chrome" approach that displays content in an efficient manner and manages display of browser instrumentalities, such as a tab band containing one or more tabs, to enable a user to more efficiently focus on a particular current user task.

The tab trimming module 109 proactively monitors and efficiently manages resource usage of individual tabs. In one or more embodiments, this can happen throughout the lifetime of the browser and without user intervention. In at least some embodiments, the web browser, through its tab trimming module, can employ heuristics to determine which tab or tabs to dehydrate. Thus, when a tab is dehydrated, it is said to be trimmed. The heuristics can employ a number of different operational properties which, collectively, can contribute to a ranking for individual tabs. Tabs can then be dehydrated in accordance with their computed rankings. Tabs can then be selectively rehydrated as a user interacts with the Web browser. For example, tabs can be rehydrated when a user actually activates a particular tab. In at least some embodiments, rehydration can occur on a tab-by-tab basis, while at least some tabs remain dehydrated.

In at least some embodiments, dehydrated tabs are visually presented to a user, via web browser user interface module 108, in a manner in which normal, active tabs are presented. Thus, from a user experience standpoint, it appears that all tabs are active. In at least some embodiments, dehydrated tabs can have their associated state saved such that when a dehydrated tab is rehydrated, the state can be restored in a manner that is generally seamless from a user's perspective.

The resource management policy module 112, if included as part of the operating system 110, is responsible, at least in part, for overseeing efficient management of system resources. To this end, the resource management policy module 112 can oversee the operation of various applications, including web browser 104, and cause the applications to go into various states depending on, for example, the state of system resources.

For example, applications can be caused, by the resource management policy module 112, to go into a suspended state. This might be the case, for example, when an application is not the primary focus of a user's present activity, such as by being placed in the background. In the suspended state, the application may still reside in memory and may still remain open. However, the application may not receive CPU cycles while in the suspended state. When an application is to assume the suspended state, the operating system or, in this case, the resource management policy module 112, may call the application to inform it that it is to assume a suspended state. Responsive to receiving this call (or at other times such as periodically), the application can take steps to save various state information so that if it is closed or terminated, when it becomes active again, it can resume operation in the pre-terminated state.

Additionally, as alluded to above, applications can be caused, by the resource management policy module 112, to go into a terminated state. In one or more embodiments, a terminated state follows a suspended state. In a terminated state, the operating system causes the application to be closed. The terminated state might be caused for a number of reasons including, by way of example and not limitation, a period of inactivity with respect to a particular application, system resource pressure, and the like. Now, when a user returns to a terminated application, the application is started and the state information that was previously saved is read and used to return the application the back into its pre-termination state.

In the Web browser context, when the Web browser receives an indication that it is to be suspended, it can save various state information associated with its current operation before it is suspended. This state information can be saved on a tab-by-tab basis and can include, by way of example and not limitation, a URL associated with a particular tab, a travel log associated with the tabs, which tabs are open, which tab is currently active, form data, scroll state/position, zoom level, state of media playback, and the like. In the context of this document, dehydration refers to the notion of saving state information associated with a particular tab or tabs. Dehydration can occur periodically or in response to some event, such as by receiving a notification that the web browser is to be suspended, and/or by ascertaining that a particular tab or tabs are to be dehydrated pursuant to processing by the tab trimming module 109. It is to be appreciated and understood that the functionality of the tab trimming module 109 may be implemented in conjunction with resource management policy module 112, or in the absence of resource management policy module 112. When implemented in conjunction with resource management policy module 112, the tab trimming module can reduce the likelihood that the web browser will be suspended and subsequently terminated by the resource management policy module. Further, the tab trimming module can help the browser complete a full hydration operation when it receives a suspend notice from the resource management policy module since it most likely already dehydrated some tabs through tab trimming. This is so because the web browser can now proactively manage its tabs and their associated resource usage and the impact such usage has on overall the system performance.

In one or more embodiment, as part of tab dehydration, a tab's title and a thumbnail image associated with the tab can be saved to disk. The thumbnail image can comprise any type of image such as an icon associated with a tab's content or a thumbnail image of the tab's web page. If the Web browser is now terminated by being placed in the terminated state or if the tab is dehydrated under the influence of the tab trimming module 109, relevant state information has been preserved to enable the tabs to be rehydrated. Specifically, assume that a user returns to a dehydrated tab within an executing web browser. The state information can be used to place the dehydrated tab in its previous state.

Figure 2:
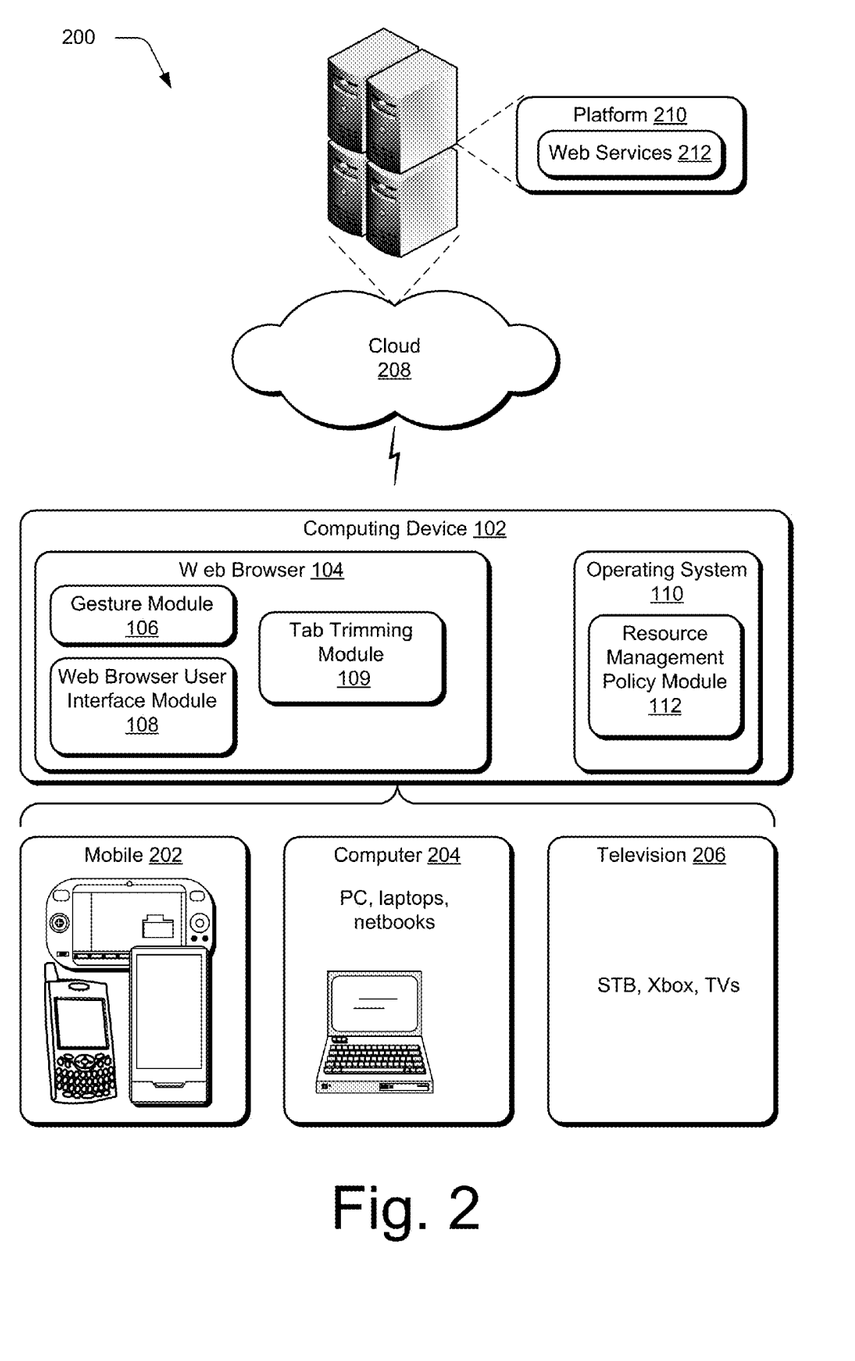
FIG. 2 is an illustration of a system in an example implementation showing FIG. 1 in greater detail.

FIG. 2 illustrates an example system 200 showing the web browser 104 implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size or form factor and thus the computing device 102 may be configured as one of these device classes in this example system 200. For instance, the computing device 102 may assume the mobile 202 class of device which includes mobile telephones, music players, game devices, slate-type or tablet-type form factor devices and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks.

The gesture techniques supported by the gesture module 106 may be detected using touch screen functionality in the mobile configuration 202, track pad functionality of the computer 204 configuration, detected by a camera as part of support of a natural user interface (NUI) that does not involve contact with a specific input device, and so on. Further, performance of the operations to detect and recognize the inputs to identify a particular gesture may be distributed throughout the system 200, such as by the computing device 102 and/or the web services 212 supported by the platform 210 of the cloud 208.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

Tab Trimming

As a user interacts with their Web browser, they can have the occasion to open multiple tabs. When a tab is open and active, it can be used to navigate to a webpage and consume web content. This, in turn, can consume system resources such as memory, CPU cycles, and the like. Often times, users may not be cognizant of the impact that their use of tabs has on the system. For example, the more tabs that are opened by user, the more memory and other system resources are used. In one or more embodiments, various operational properties of individual tabs are monitored so that an informed decision can be made to dehydrate a particular tab.

When a tab is dehydrated and hence trimmed, its state, as noted above, is saved so that it can be later rehydrated. In addition, the tab's process is terminated in order to conserve system memory resources. If a user returns to a particular tab that has been dehydrated, as by clicking on or touch-selecting a tab, it can be rehydrated. When a tab is rehydrated, a corresponding process is initiated and the tab's saved state is utilized to return the tab to its pre-dehydrated state. This can include performing a navigation to a particular URL and restoring various settings associated with the saved state.

Figure 3:
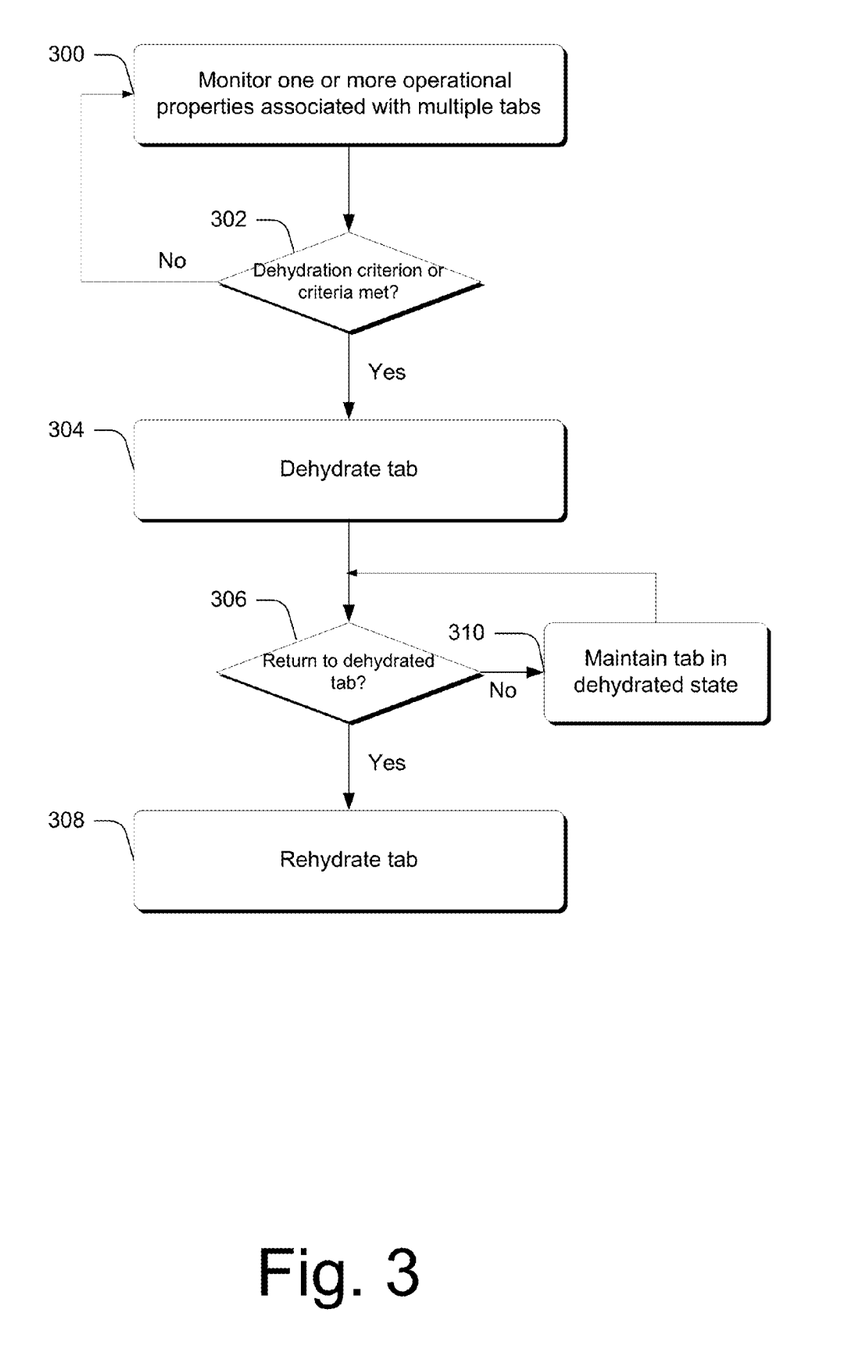
FIG. 3 is a flow diagram that describes steps in a method in accordance with one or more embodiments.

FIG. 3 is a flow diagram that describes steps in a method in accordance with one or more embodiments. The method can be performed in connection with any suitable hardware, software, firmware, or combination thereof. In at least some embodiments, the method can be performed by a suitably-configured web browser, such as the one described above.

Step 300 monitors one or more operational properties associated with multiple tabs. Any suitable operational property or properties can be monitored. For example, in at least some embodiments, an operational property in the form of system resource usage, e.g., memory usage, associated with individual tabs can be monitored. Alternately or additionally, other operational properties can be monitored. For example, operational properties associated with a user's use or engagement of the tab can be monitored. Examples of such properties can include, by way of example and not limitation, the last time a particular tab was accessed by a user. Alternately or additionally, operational properties associated with the tab itself can be monitored such as, by way of example and not limitation, the age of the tab. Alternately or additionally, an operational property associated with a tab's effect on the system or user experience as a result of dehydration and subsequent rehydration can be considered. Thus, in this instance, the monitoring would include ascertaining a particular task or tasks being accomplished by a tab and, in view of the particular task or tasks, making a decision on whether to dehydrate a particular tab based on the effect that it would have on the system. For example, tabs that contain state that is hard to recover may be considered to be exempt from dehydration. Alternately or additionally, an operational property associated with whether a particular task is incomplete can be considered as well. For example, a tab may be in the process of downloading a particular media file. In this instance, a dehydration decision can be made in an informed manner so as to avoid or reduce the likelihood of impacting the tab's task. Thus, when such tasks are complete, the associated tab can be dehydrated.

Step 302 ascertains whether dehydration criterion or criteria have been met. This step can be performed in any suitable way. For example, the operational properties of individual tabs may have associated threshold values or events associated with them. For example, a threshold value might be associated with an amount of memory that is being consumed by a tab, or a period of time that has elapsed since a tab was last accessed. Alternately or additionally, a threshold event might be associated with a current task being accomplished by a particular tab or cessation of a particular task. If dehydration criterion or criteria are met, step 304 can dehydrate the associated tab. Dehydration can occur, as noted above, by saving a tab's state and terminating its process. If, on the other hand, dehydration criterion or criteria are not met, the method can return to step 300 and continue monitoring the operation of properties.

Step 306 ascertains whether there has been an attempt to return to a dehydrated tab. This step can be performed in any suitable way. For example, if a user clicks on or otherwise touch-engages a particular tab that has been dehydrated, step 308 can rehydrate the tab. Such can be done by initiating a process for the tab and using its saved state to restore the tab to its pre-dehydrated state. If, on the other hand, there has been no attempt to return to a dehydrated tab, step 310 maintains the associated tab in a dehydrated state and returns to step 306.

Having considered the general notion of tab trimming in accordance with one or more embodiments, consider now tab trimming in the context of a rating system.

Tab Trimming Using a Rating System

In one or more embodiments, tabs can be trimmed using a rating system. Tabs that achieve a particular rating or exceed a rating threshold can then be selected for dehydration. As an example, consider the following.

Recall from the above discussion that various operational properties can be monitored to ascertain whether to dehydrate a particular tab. These operational properties include, by way of example and not limitation, a tab's system resource usage, last tab access time, age of the tab, a tab's effect on the system or user experience as a result of dehydration and subsequent rehydration, whether a particular task being performed by a tab is incomplete, and the like.

In one or more embodiments, multiple operational properties can receive a rating which contributes to an overall rating for a particular tab. Those tabs that have an overall rating that exceeds a particular value can be selected for dehydration. As an example, consider that there are three operational properties that are being monitored—OP1, OP2, and OP3. Assume further that there are three tabs that are open, one of which—TAB0—is being actively engaged by a user. The other two tabs—TAB1 and TAB2 are not being actively engaged. For the tabs that are not being actively engaged by the user, the operational properties are monitored and rated accordingly. For example, assume that the rating system rates operational properties with values between 0-5. Assume further that the table below describes how the tabs rate out:

|  | TAB1 | TAB2 |
|---|---|---|
| OP1 | 0 | 0 |
| OP2 | 3 | 1 |
| OP3 | 5 | 2 |
| Overall Rating | 8 | 3 |

In this particular example, assume that an overall rating of seven or higher means that the tab should be dehydrated. In this example, the operational properties that are rated for TAB1 combine for an overall rating of 8. Similarly, the operational properties that are rated for TAB2 combine for an overall rating of 3. Accordingly, in this example, based on its overall rating, TAB1 can be selected for dehydration.

It is to be appreciated and understood that any suitable type of rating system can be utilized without departing from the spirit and scope of the claimed subject matter. In addition, any suitable number and/or combination of operational properties can be utilized.

Figure 4:
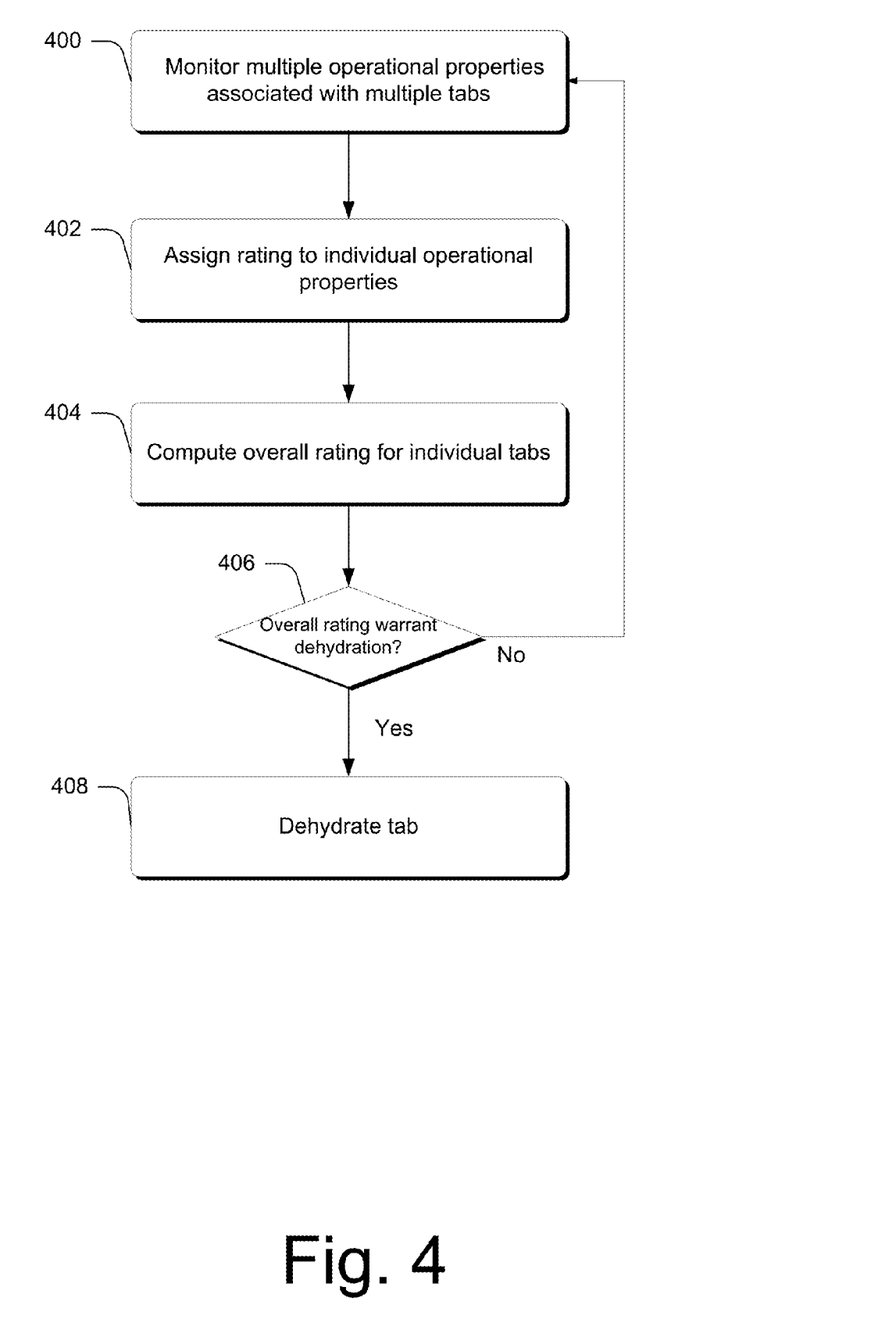
FIG. 4 is a flow diagram that describes steps in a method in accordance with one or more embodiments.

FIG. 4 is a flow diagram that describes steps in a method in accordance with one or more embodiments. The method can be performed in connection with any suitable hardware, software, firmware, or combination thereof. In at least some embodiments, the method can be performed by a suitably-configured web browser, such as the one described above.

Step 400 monitors multiple operational properties associated with multiple tabs. This step can be performed in any suitable way. In one or more embodiments, the step can be performed by monitoring operational properties associated with at least one tab that is not actively being engaged by a user. Examples of operational properties are provided above. Step 402 assigns a rating to individual operational properties that are being monitored. Step 404 computes an overall rating for individual tabs based on the rated operational properties for a particular tab. Step 406 ascertains whether the overall rating warrants dehydration for a particular tab. The step can be performed in any suitable way. For example, a threshold value can be defined for the overall rating and, once exceeded, a tab can be dehydrated. If the overall rating does not warrant dehydration, the method can return to step 400. If, on the other hand, the overall rating for a particular tab of warrants dehydration, step 408 dehydrates the tab.

In one or more embodiments, a tab can be rehydrated in any suitable way. For example, a dehydrated tab can be rehydrated as described above in step 308 of FIG. 3.

Having described an example rating system that can be utilized to dehydrate tabs, consider now a discussion of dehydrated tab visualizations.

Dehydrated Tab Visualization

As noted above, in at least some embodiments, dehydrated tabs can be visually presented to a user in a manner in which normal, running tabs are presented. Thus, from a user experience standpoint, it appears that all tabs are running when, in fact, less than all of the tabs may be running. As an example, consider FIG. 5.

Figure 5:
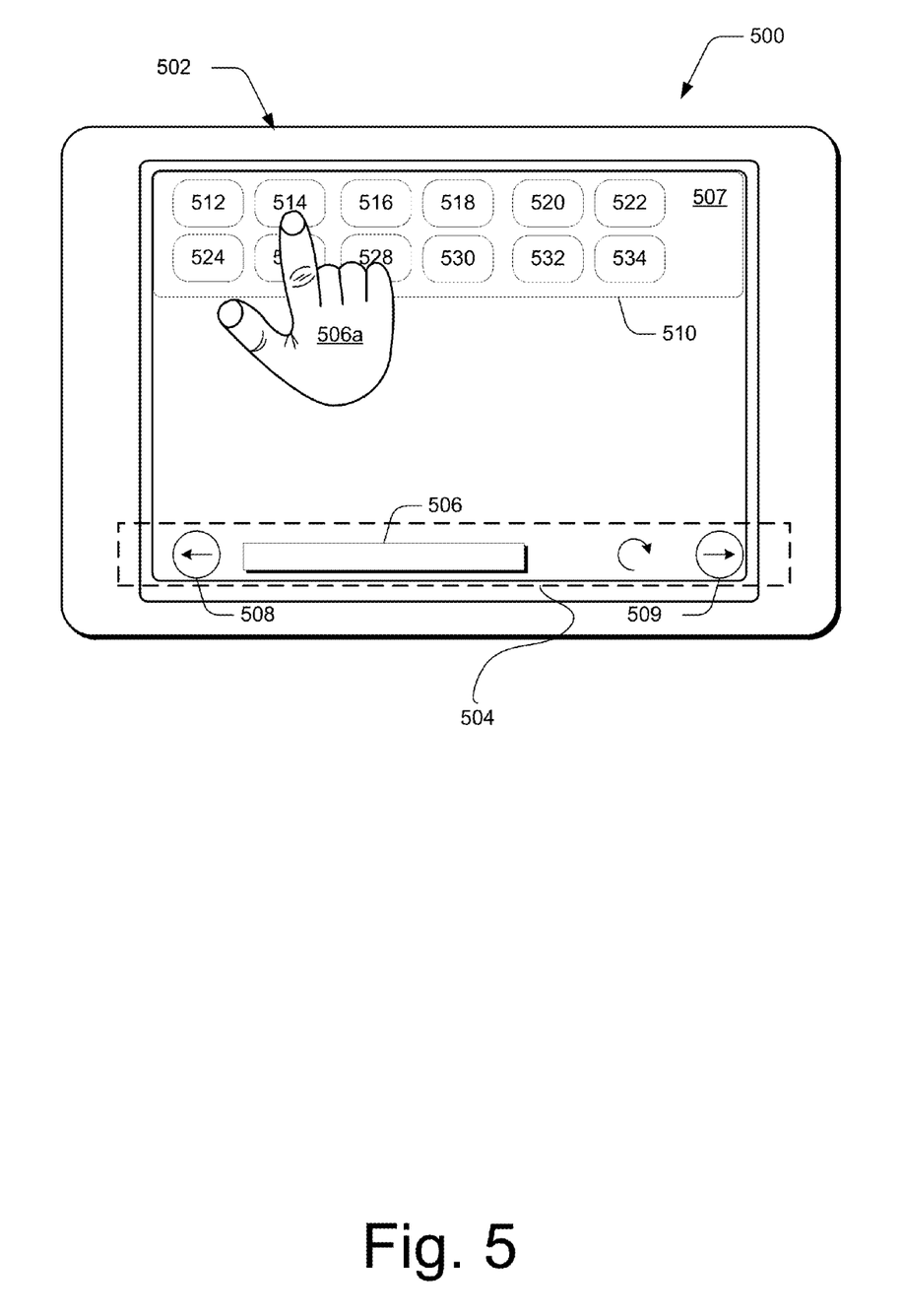
FIG. 5 illustrates an example device that can be utilized to implement one or more embodiments.

An example environment 500 includes a computing device 502 in accordance with one or more embodiments. Computing device 502 includes a display device 507 having a region 504 at the bottom of the display device, and various navigation and other instrumentalities that have been invoked and visually displayed. Specifically, the instrumentalities include an address bar 506, back button 508, and forward button 509.

In this example, a tab band 510 appears at the top of display device 507 and includes multiple tabs 512-534. In this particular example, assume that the active tab is tab 512, and the remaining tabs have been dehydrated. To provide a user experience that makes it appear like the dehydrated tabs are rehydrated, dehydrated tabs can have their own visualization. For example, in at least some embodiments, tabs that remain dehydrated can have a visualization within tab band 510 that includes a title and a thumbnail image.

Assume now that a user's hand 506a tap-engages tab 514. In this instance, tab 514 can be rehydrated. To do so, the Web browser can initiate a process associated with tab 514, and use the tab's state information to cause navigation to an associated URL, at which point tab 514 can now become the active tab. In this particular example, two tabs—tabs 512, 514 have been rehydrated while tabs 516-534 remain dehydrated. By virtue of not being the active tab any longer, tab 512 can now undergo the evaluation described in FIG. 4.

Figure 6:
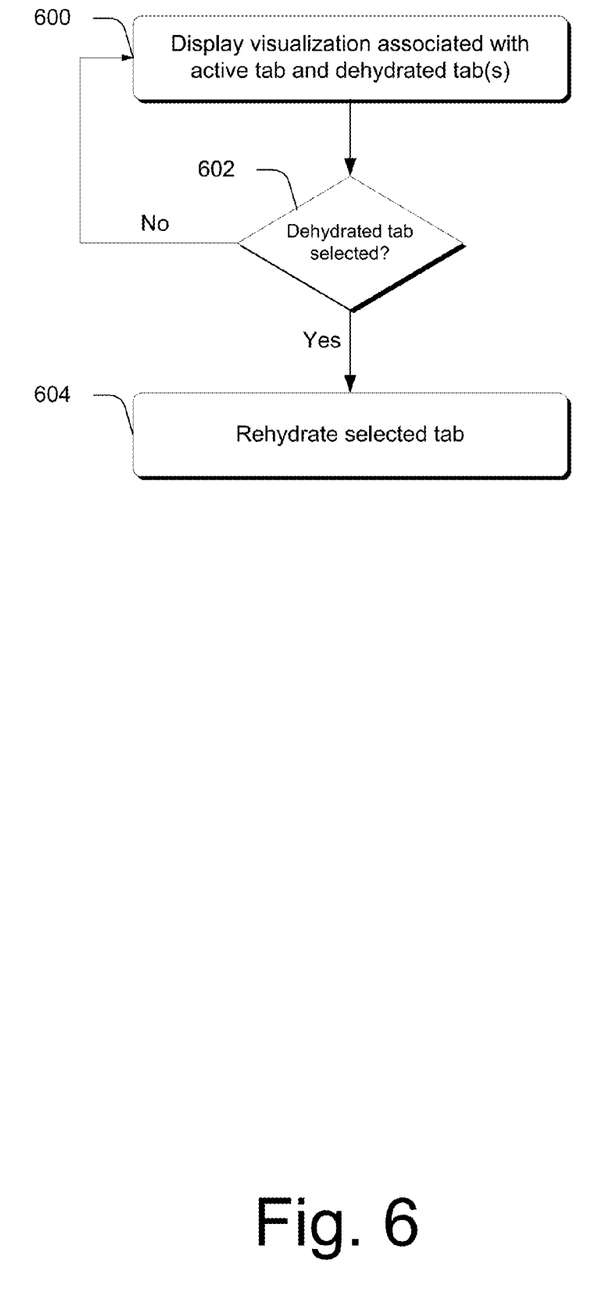
FIG. 6 is a flow diagram that describes steps in a method in accordance with one or more embodiments.

FIG. 6 is a flow diagram that describes steps in a method in accordance with one or more embodiments. The method can be performed in connection with any suitable hardware, software, firmware, or combination thereof. In at least some embodiments, the method can be performed by a suitably-configured web browser, such as the one described above.

Step 600 displays visualizations associated with the active tab and any dehydrated tabs. This step can be performed in any suitable way. In one or more embodiments, this step can be performed by displaying visualizations associated with the dehydrated tabs that are of the same type as that of any active tabs. In this manner, dehydrated tabs appear, to the user, as if they are fully functioning running tabs. Any suitable type of visualization can be utilized. In one or more embodiments, the visualization can include a title that can be either displayed within the tab or slightly below the tab and/or a thumbnail image that appears within the tab. Step 602 ascertains whether a dehydrated tab has been selected by a user. This step can occur in any suitable way such as, by way of example and not limitation, ascertaining that a user has selected a particular tab as by providing input, such as touch or other type of input. If a dehydrated tab has not been selected, the method can return to step 600 and continue to display the visualizations. If, on the other hand, a dehydrated tab has been selected, step 604 rehydrates the selected tab. Examples of how a tab can be rehydrated are provided above. The method can then return to step 600.

Having described various example embodiments, consider now a discussion of an example device that can be utilized to implement one or more embodiments.

Example Device

Figure 7:
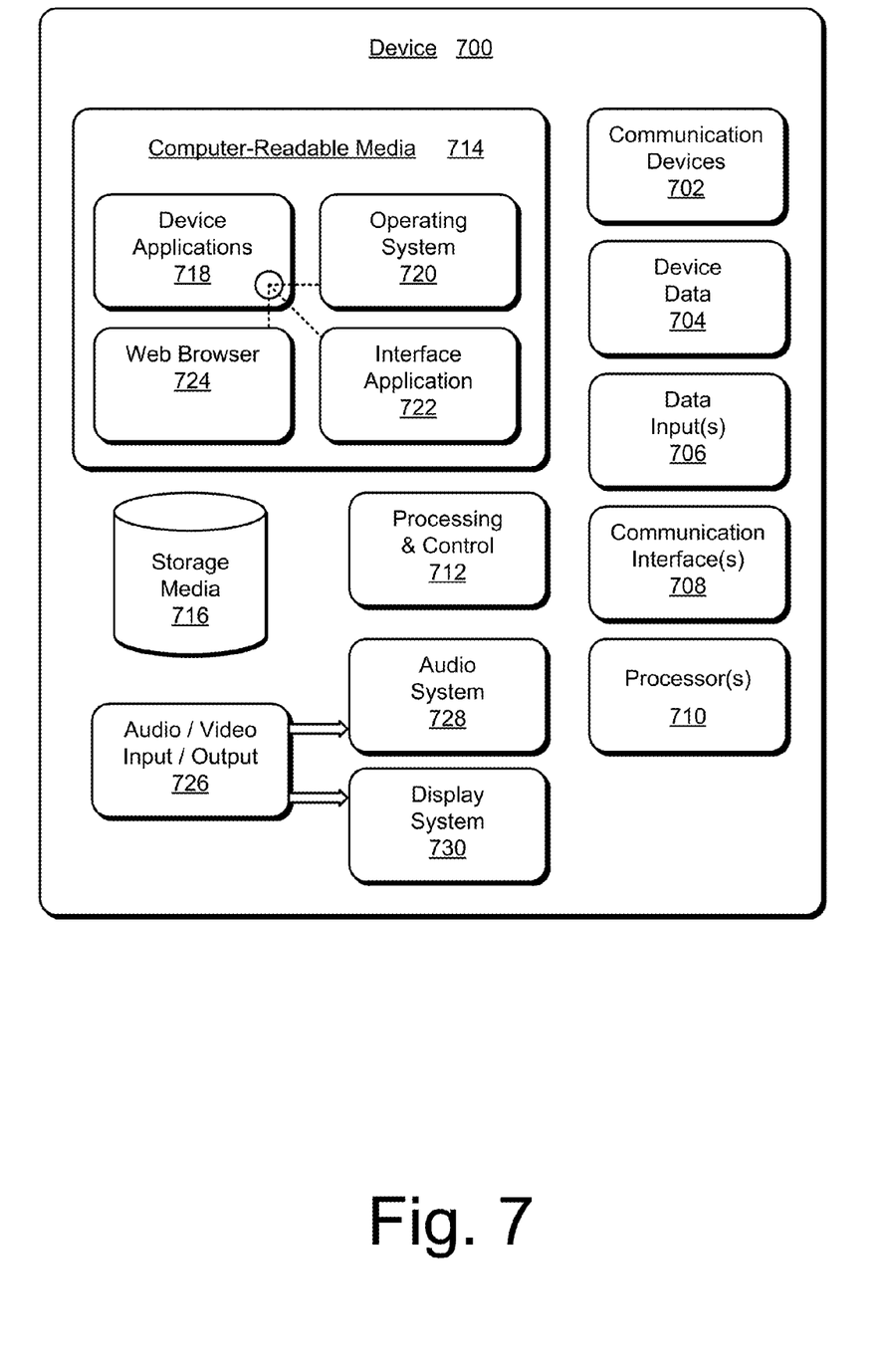
FIG. 7 illustrates an example computing device that can be utilized to implement various embodiments described herein.

FIG. 7 illustrates various components of an example device 700 that can be implemented as any type of portable and/or computer device as described with reference to FIGS. 1 and 2 to implement the embodiments described herein. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable or readable instructions to control the operation of device 700 and to implement the on-demand tab rehydration embodiments described above. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.). The device applications 718 also include any system components or modules to implement embodiments of the on-demand tab rehydration techniques described herein. In this example, the device applications 718 include an interface application 722 and a web browser 724 that are shown as software modules and/or computer applications. The web browser 724 is representative of software that is used to provide web browsing functionality, including an interface with a device configured to capture gestures, such as a touch screen, track pad, camera, and so on.

Device 700 also includes an audio and/or video input-output system 726 that provides audio data to an audio system 728 and/or provides video data to a display system 730. The audio system 728 and/or the display system 730 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700. Alternatively, the audio system 728 and/or the display system 730 are implemented as integrated components of example device 700.

CONCLUSION

Various embodiments proactively monitor and efficiently manage resource usage of individual tabs. In at least some embodiments, one or more tabs can be dehydrated in accordance with various operational properties, and rehydrated when a user actually activates a particular tab. In at least some embodiments, rehydration can occur on a tab-by-tab basis, while at least some tabs remain dehydrated.

In at least some embodiments, dehydrated tabs are visually presented to a user in a manner in which normal, active tabs are presented. Thus, from a user experience standpoint, it appears that all tabs are active. In at least some embodiments, dehydrated tabs can have their associated state saved such that when a dehydrated tab is rehydrated, the state can be restored in a manner that is generally seamless from a user's perspective.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising:
   monitoring, by a computing device, one or more operational properties associated at least one tab rendered for display on the computing device with one or more visualizations, the one or more operational properties including a resource usage and a last time a particular tab was accessed;
   computing an overall rating for the at least one tab, based at least in part on the one or more operational properties;
   determining, by the computing device, that the overall rating exceeds a threshold value that warrants dehydration of the at least one tab; and
   dehydrating, by the computing device, the at least one tab, including saving state information associated with the at least one tab, terminating a process associated with the at least one tab, and continuing rendering the at least one tab with the one or more visualizations.

2. The computer-implemented method of claim 1, wherein computing the overall rating includes assigning, by the computing device, individual ratings to respective operational properties, and calculating, by the computing device, the overall rating from the individual ratings associated with the respective operational properties.

3. The computer-implemented method of claim 1, wherein the one or more operational properties include memory usage.

4. The computer-implemented method of claim 1, the one or more operational properties include an operational property associated with a tab's effect on an associated system as a result of dehydration and subsequent rehydration.

5. The computer-implemented method of claim 1, wherein the state information comprises one or more of: a URL associated with the at least one tab, a travel log associated with the at least one tab, form data, scroll state/position, zoom level, or state of media playback.

6. The computer-implemented method of claim 1, further comprising ascertaining, by the computing device, that there has been an attempt to access the at least one tab; and rehydrating, by the computing device, the at least one tab, including applying the saved state information to the at least one tab.

7. One or more computer readable storage media embodying computer readable instructions which, when executed, implement a method comprising:
   monitoring one or more operational properties associated with at least one tab rendered for display on the computing device with one or more visualizations, wherein the one or more operational properties include a resource and a last time a particular tab was accessed;
   assigning ratings to individual operational properties of the one or more operational properties;
   computing, from the ratings assigned to the individual operational properties, an overall rating for the at least one tab;
   determining that the overall rating exceeds a threshold value that warrants dehydration; and
   dehydrating the at last one tab, including saving state information associated with the at least one tab, terminating a process associated with the at least one tab, and continuing rendering the at least one tab with the one or more visualizations.

8. The one or more computer readable storage media of claim 7, wherein the one or more operational properties include memory storage.

9. The one or more computer readable storage media of claim 7, wherein the state information comprises one or more of: a URL associated with the associated tab, a travel log associated with the associated tab, form data, scroll state/position, zoom level, or state of media playback.

10. The one or more computer readable storage media of claim 7, further comprising ascertaining that there has been an indication to access the at least one tab; and rehydrating the at least one tab, including applying the saved state information to the at least one tab.

11. A system comprising:
   one or more computer readable storage media; and
   a web browser embodied on the one or more computer readable storage media and configured to implement a method comprising:
   monitoring one or more operational properties associated with at least one tab rendered for display on the computing device with one or more visualizations, the one or more operational properties including a resource usage resource and a last time a particular tab was accessed;

computing an overall rating for the at least one tab, based at least in part on the one or more operational properties;

determining that the overall rating exceeds a threshold value that warrants dehydration of at least one tab; and dehydrating the at least one tab, including saving state information associated with the at least one tab, terminating a process associated with the at least one tab, and continuing rendering the at least one tab with the one or more visualizations.

12. The system of claim 11, wherein the one or more operational properties include memory usage.

13. The system of claim 11, wherein computing the overall rating includes assigning individual ratings to respective operational properties, and calculating the overall rating from the individual ratings associated with the respective operational properties.

\* \* \* \* \*